April 18, 1939. S. QUISLING 2,154,822
WAX AND CELLULOSE ESTER COMPOSITION
Filed Feb. 8, 1935
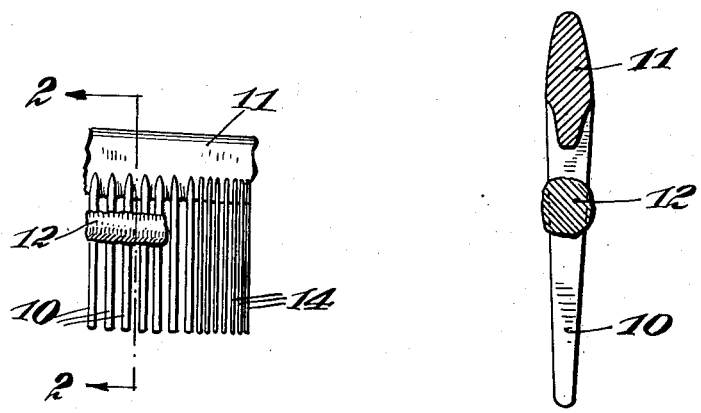
Fig.1. Fig.2.
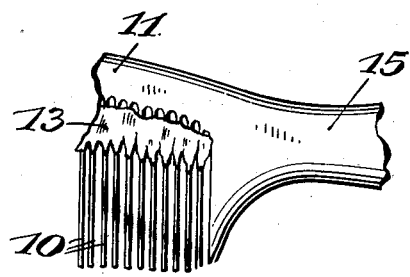
Fig.3. Sverre Quisling INVENTOR.
BY Edward Thomas ATTORNEY.

Patented Apr. 18, 1939

2,154,822

UNITED STATES PATENT OFFICE 2,154,822

WAX AND CELLULOSE ESTER COMPOSITION

Sverre Quisling, Madison, Wis.

Application February 8, 1935, Serial No. 5,619

5 Claims. (Cl. 167—88)

This invention relates to wax and cellulose ester compositions and is herein described in some detail as embodied in material for coloring human hair.

In the past, dyes have been used for coloring human hair, but the most successful dyes from an artistic point of view have been lead or silver or mercury dyes, many of which are poisonous, and all of which, and also the aniline dyes used, are toxic to some people. Moreover, the hair to which the dyes have been applied usually needed long subsequent drying, often as much as six hours, and usually required the services of an expert, if satisfactory results were to be obtained.

According to one form of the present invention, these and other difficulties are overcome, and the hair is coated with an almost imperceptible covering which includes microscopic or almost microscopic particles of pigment in a transparent coating thus giving an effect similar to the natural color of the hair which varies slightly on a given head.

The coloring matter of the present invention has been found to be useful for very rapid application when applied to a comb, the hair is colored by combing with the comb carrying the coloring matter, although a superior effect is often obtained by applying the coating with a brush which has been moistened with the coloring matter.

The coloring matter may be molded on or otherwise fixed to the comb and softened by heating or by treating with a few drops of a softening fluid, usually a volatile organic solvent, as desired, or the coloring matter may be provided in paste form in admixture with the softener, as in a collapsible tube and squeezed out on to the comb as desired for use, provided it is used fairly promptly or is softened before use. The coloring matter has also been most successfully applied to the hair by means of a small brush, such as a tooth brush. For the latter purpose, it has been found convenient to provide discs of the solid coloring matter cast into shallow stamped metal plates, so that a little of the softening fluid may be poured on to a plate, a little of the softened coloring matter gathered on the bristles of the brush and brushed into the hair.

For some of these purposes the coloring matter may consist of a wax carrying a pigment. The best wax seems to be Japan wax carrying ceresine or beeswax mixed with ceresine. The pigment carried in the wax may be a mineral or vegetable or synthetic organic pigment such as a dye.

The most satisfactory softener seems to be acetone mixed with some so-called organic solvent to modify its volatility.

It has been found that black hair can be evenly colored a beautiful brown or even white, and the coloring can be removed completely in a few minutes if desired, as for example by actors in a theatre.

Cellulose esters, such as cellulose nitrate and cellulose acetate have also been found to be useful as a body material adapted to carry the coloring material.

In the use of a cellulose ester, the cellulose ester may be dissolved in acetone carrying a salicylate or a benzoate. An aqueous solution of acetone and an organic salt may then be added to the cellulose ester solution without precipitating a properly prepared solution. The cellulose ester solution may be mixed with wax solution, if desired, especially with a wax solution carrying petroleum benzine.

The solution of cellulose ester may yield valuable products, as will appear below, instead of serving as hair coloring matter.

Other features and advantages will hereinafter appear.

In the accompanying drawing,

Figure 1 is a fragmentary view of a comb carrying hair coloring wax.

Figure 2 is a sectional view of the same on the line 2—2.

Figure 3 is a view of a modified comb.

To prepare a black coloring material for the hair, ceresine and beeswax were melted and to this mixture was added a proportion of carbon black, and the batch thoroughly mixed. The resulting molten black wax was poured out in a thin layer on a metal plate having a slightly depressed flat center.

When cool the surface of the mixture was moistened with acetone to which had been added an activating agent such as benzine or gasoline or isopropyl alcohol. Some of the softened black wax was gathered on the bristles of the brush and the brush drawn through the hair. This treatment left the hair glossy and black and it had the appearance of naturally black hair. It was found that the wax would carry upwards of an equal amount of the black or other coloring pigment. Such a mixture does not smut.

It was found that hair thus treated with wax was easily and fairly permanently curled or permanently straightened at will by combing with a hot comb, hot enough to soften the wax covering on the hair. By proper manipulation of the comb so as to momentarily soften the wax and let it cool and harden while the hair is held at the desired curl, a more permanent curl is obtained than by usual water-waves. Curly hair may be straightened by the same procedure.

It was found that other wax-like substances such as ordinary paraffine wax carrying the black or tallow carrying it, or ceresine carrying it, or Japan wax carrying it, and mixtures of these were useful to the same ends. The tallow was wax-like enough to be useful though not equal to beeswax.

For merely straightening or curling hair, uncolored wax or wax like substances may be used. Other useful coloring materials were white zinc oxide, red and brown oxide or iron, indigo, Congo red, the helio red BMTA of General Dyestuffs Corporation, their hansa yellow Gaw, their permanent orange G. E., their ultramarine. All of these were useful when carried in several of the waxes, and most of them were useful when carried in cellulose esters solutions.

It was found possible to dissolve the pigment-bearing wax in so little acetone, or to dissolve wax in so little acetone mixed with other solvents and add a pigment so that the resulting paste was easily expelled from a collapsible tube and delivered in a roll on a comb and combed into the hair with similar results.

The best solvent for the wax was hexyl alcohol, but owing to its strong odor it was usually diluted with acetone. Isopropyl alcohol was almost equally good. The methyl ether of ethylene glycol was also very satisfactory.

The wax was easily removed by moistening the hair with water carrying about 10% to 25% of sodium or alkali metal salicylate and 10% of alcohol, and then washing as usual, either with soap and water or under a water shower. Instead of the salicylate it was possible to substitute other organic salts such as an oxalate, or citrate, or benzoate.

Isopropyl alcohol was the best alcohol and the addition of a small amount of acetone was found useful in the mixture.

One very satisfactory means of applying the wax to hair was found to be to fasten a layer of wax along the teeth of a comb, as shown in the drawing. The comb may be an ordinary type of comb, such as metal or hard rubber comb, in which teeth 10 project from the ordinary back 11. The comb carries a pressed-in bar of wax 12 which fills the space between the teeth for a fraction of their length. The wax may stand out above the surface of the comb so that the hair passing through the comb may have a fairly long travel over the wax. The wax 12 may be well down toward the points of the teeth as shown in Figure 1, or may lie at 13, against the base of the teeth as shown in Figure 3.

The comb of Figure 1 is shown as provided with the usual unwaxed fine teeth 14 as well as the coarse teeth 10, and the comb of Figure 3 is shown with a handle 15.

Similar results were obtained by dissolving cellulose ester, such as nitro cellulose or acetyl cellulose in an acetone solution of alkali-metal or sodium salicylate or, not quite so good, of sodium benzoate or citrate or oxalate. The amount of the sodium salt used may vary from ten percent or less to twenty-five percent or more, depending on the kind of solution desired. Acetyl cellulose equal to about one-fourth of the volume of the solution was used. A comb carrying a ribbon of this slightly viscous mixture or solution, after the mixture or solution had been colored, proved satisfactory. The mixture or solution was colored with a black or other pigment or any of several water-soluble aniline dyes. Thus the cellulose solution was dyed instead of colored by means of a pigment like the wax solution.

It was found that ten to twenty-five percent of water carried in acetone with organic acid in solution could be added to the solution of cellulose ester without precipitating the cellulose. The coatings formed from the cellulose ester solutions containing the higher proportions of water could be removed from the hair with greater ease than those formed from solutions containing lesser proportions of water.

The cellulose coating falls off the hair if washed or combed with a strong solution of sodium salicylate or the other salts named above, or even with water.

It was found possible to make a cellulose ester glove on the hand by dipping the hand in the solution of cellulose ester in acetone carrying the salicylate and water. The glove was made aseptic by previously adding guiacol to the solution. Such a solution had a phenol coefficient of 12 to 14 compared to a 5% solution of phenol, the strongest that the average human skin can stand.

The glove on the hand was removed by washing with hot water, coming off rather hard if no more than five or ten percent of the salicylate had been added to the acetone solution. The same solution was usable to paint an aseptic covering on a patient before a surgical operation,—one easily removed after the operation.

Cellulose nitrate or acetate was dissolved in acetone, or other solvent, such as 1, 4, diethylene oxide, monoethyl ether of ethylene glycol, or methyl isobutyl ketone, and to this was added sodium oxalate carried in a mixture of water and acetone, forming a sticky milky solution which was precipitated further by the addition of further quantities of water-acetone-sodium oxalate solution. Slow addition of further quantities of water-acetone-sodium oxalate solution resulted in the formation of a precipitate which could be drawn into an elastic, strong, transparent thread. The elasticity, strength and transparency of the threads drawn from such precipitates decreased with an increase in the rate of addition of water-acetone-sodium oxalate solution.

In this and other tests the sodium salt was dissolved to make a 10% to 25% solution in acetone. About one-fourth volume of cellulose acetate mixture was mixed with the solution of the sodium salt and acetone. The final mixture may contain 10% to 25% water.

Useful, but not as good results were obtained when bicarbonate of soda was substituted for the oxalate, or sodium malate was substituted. The compound of soda with asparagine was also useful.

Better results were obtained by substituting sodium salicylate, and nearly as good, by substituting sodium citrate, or sodium acetate.

Alkali metal salts other than sodium may be used. The glove described above may be made from the solutions carrying such salts.

Sodium salicylate carried in water and acetone to which a small quantity of guiacol was added made an excellent solvent for cellulose acetate, yielding on addition of water, an easily workable plastic which rose to the surface of the liquid and floated thereon. This plastic mass could be easily drawn into threads. The guiacol increased the proportion of water which could be safely added without the formation of a precipitate. These and other plastics were easily dyed with several aniline dyes.

It was found possible to add more water to the acetone solution if an aromatic hydroxy compound such as guiacol was first added. It was also frequently possible to dissolve more ester in a solution in acetone to which had been added a solution of an organic salt in water and acetone. Cresols, and creosol to a less extent, and phenol were also useful.

Threads of mixed esters may be obtained by dissolving the esters in the same solvent and proceeding as described above.

The nitrocellulose used was that tri-nitro cellulose sold for use as an adhesive and was made by the du Pont Company.

Zinc oxide carried in an equal weight of wax can be manipulated to give varying effects in coloring hair. On very black hair a heavy coat gives a platinum blonde. By adding more solvent in applying a thin coat of the wax carrying the zinc oxide, a beautiful effect of prematurely grey hair can be obtained.

A mixture of zinc oxide with one-third as much hansa yellow in the wax gives a yellow blonde. Zinc oxide has also proved useful in making lighter colors which seemed too dark.

Having thus described certain embodiments of the invention, what is claimed is:

1. A coating composition for use on skin and hair which, when dry will not come off with water at room temperature but is easily removed with heated water, said composition in solution including cellulose acetate, an organic cellulose ester solvent with from 10 to 25 percent water and 7.5 to 18 percent salt selected from the group consisting of sodium bicarbonate, sodium citrate, sodium malate, sodium oxalate, sodium benzoate and sodium salicylate.

2. A coating composition for use on skin and hair which when dry will not come off with water at room temperature but is easily removed with heated water, said composition in solution including cellulose acetate, a wax, an organic cellulose ester solvent, from 10 to 25 percent water, and from 7.5 to 18 percent of at least one salt selected from the group consisting of sodium bicarbonate, sodium citrate, sodium malate, sodium oxalate, sodium benzoate and sodium salicylate.

3. A coating composition for use on skin and hair which when dry will not come off with water at room temperature but is easily removed with heated water, said composition in solution including cellulose acetate, an organic cellulose ester solvent, and from 10 to 25 percent water, and from 7.5 to 18 percent sodium salicylate.

4. A coating composition for use on skin and hair which when dry will not come off with water at room temperature but is easily removed with heated water, said composition in solution including cellulose acetate, an organic cellulose ester solvent, and from 10 to 25 percent water, and from 7.5 to 18 percent sodium bicarbonate.

5. A coating composition for use on skin and hair which when dry will not come off with water at room temperature but is easily removed with heated water, said composition in solution including cellulose acetate, a cellulose ester solvent, and from 10 to 25 percent water, and from 7.5 to 18 percent sodium benzoate.

SVERRE QUISLING.